US008368923B2

(12) United States Patent
Okamoto

(10) Patent No.: US 8,368,923 B2
(45) Date of Patent: Feb. 5, 2013

(54) IMAGE FORMING APPARATUS AND IMAGE FORMING SYSTEM

(75) Inventor: Kazuhiro Okamoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1119 days.

(21) Appl. No.: 12/290,502

(22) Filed: Oct. 31, 2008

(65) Prior Publication Data

US 2009/0116065 A1 May 7, 2009

(30) Foreign Application Priority Data

Nov. 2, 2007 (JP) ................................. 2007-286668

(51) Int. Cl.

| | |
|---|---|
| ***G06F 3/12*** | (2006.01) |
| ***G06K 15/00*** | (2006.01) |
| ***H04N 1/00*** | (2006.01) |

(52) U.S. Cl. ........................ 358/1.15; 358/1.6; 358/1.16

(58) Field of Classification Search ................... 358/1.6, 358/1.15, 1.16

See application file for complete search history.

(56) References Cited

U.S. PATENT DOCUMENTS

| | | | | |
|---|---|---|---|---|
| 7,755,792 | B2 * | 7/2010 | Sakayama et al. | 358/1.15 |
| 7,839,515 | B2 * | 11/2010 | Shigeeda | 358/1.14 |
| 8,203,732 | B2 * | 6/2012 | Shiiyama | 358/1.15 |
| 2004/0179221 | A1 * | 9/2004 | Endo et al. | 358/1.13 |
| 2007/0091346 | A1 * | 4/2007 | Ogura et al. | 358/1.14 |
| 2008/0002226 | A1 * | 1/2008 | Shigeeda | 358/1.15 |

FOREIGN PATENT DOCUMENTS

| | | |
|---|---|---|
| EP | 1 889 726 | 2/2008 |
| JP | 04-052161 | 2/1992 |
| JP | A 2002-366318 | 12/2002 |
| JP | A 2004-72598 | 3/2004 |
| JP | 2004-126607 | 4/2004 |
| JP | A 2005-169735 | 6/2005 |
| JP | A 2006-341405 | 12/2006 |
| JP | 2008-023890 | 2/2008 |

* cited by examiner

*Primary Examiner* — King Poon
*Assistant Examiner* — Jonathan Beckley
(74) *Attorney, Agent, or Firm* — Edwards Wildman Palmer LLP; David G. Conlin; David A. Tucker

(57) ABSTRACT

An image forming apparatus capable of reprinting image data once printed without requiring a server system for integrally managing image data is provided. A storage section individually provided in an image forming apparatus stores inputted image data, and an information generating section generates log information of the image data to record on an IC card outside the apparatus. Then, based on position information included in the log information, a data reading section specifies a storage section in which desired image data is stored among storage sections provided in a plurality of image forming apparatuses capable of implementing data communication, and reads the desired image data from the specified storage section.

9 Claims, 6 Drawing Sheets

IMAGE FORMING APPARATUS AND IMAGE FORMING SYSTEM

CROSS-REFERENCE TO RELATED APPLICATION

This application claims priority to Japanese Patent Application No. 2007-286668, which was filed on Nov. 2, 2007, the contents of which are incorporated herein by reference in its entirety.

BACKGROUND OF THE INVENTION

1. Field of the Invention

The present invention relates to an image forming apparatus capable of reprinting image data once printed, and an image forming system.

2. Description of the Related Art

When carrying out reprinting such that image data created by a PC (Personal Computer) or the like is inputted into an image forming apparatus such as a printer to be printed once and the image data is printed again, there is a method wherein image data is stored on a recording medium and desired image data is read from the recording medium to carrying out reprinting. However, since a capacity of the image data is very large, it is necessary to use a large-capacity recording medium such as a USB (Universal Serial Bus) memory as the recording medium. In addition, in recent years, there has been general atmosphere that does not permit to take out information by recording the image data on a general media, such as a USB, which can be read by anyone, from a viewpoint of protecting secret information.

Hence, an image forming system is proposed, that image data is integrally managed by a document management system and desired image data is acquired from the document management system so that the image data can be reprinted by an image forming apparatus. Examples of such an image forming system include following two systems. In a first type of image forming system, when an image forming apparatus that has received an instruction to reprint image data reads desired image data, the image forming apparatus logs into the document management system, and, based on indexes applied to image data, searches and acquires the desired image data by a detecting section from a plurality of sets of image data stored in an image data saving storage. In a second type of image forming system, an ID (identification) for identifying a user is issued from the document management system. The second type of image forming system will hereinafter be described with reference to the drawing.

FIG. 6 is a view showing the structure of an image forming system 200 in a related art. In the image forming system 200, a plurality of image forming apparatuses 201, 202, and 203 are connected through a network 208 to a document management system 209. The document management system 209 is a system that provides IDs to a plurality of sets of image data inputted from an image inputting apparatus 205 to manage integrally. The document management system 209 is configured by having an image data ID management server 206 for managing an ID applied to each image data, and an image data saving storage 207 for storing image data. For example, in the image forming apparatus 201, desired image data is read from the image data saving storage 207, the image forming apparatus 201 transmits an ID inputted by an ID input console 204 through the network 208 to the document management system 209. The document management system 209 that has received the ID collates the received ID with IDs managed in the image data ID management server 206, takes out the specified image data from the image data saving storage 207, and transmits the image data through the network 208 to the image forming apparatus 201. When receiving the image data transmitted from the document management system 209 as described above, the image forming apparatus 201 is able to read and reprint the desired image data.

Furthermore, Japanese Unexamined Patent Publication JP-A 2004-126607 discloses an image forming system wherein a plurality of image forming apparatuses are connected to each other through a network and image data read by an optional image forming apparatus can be transferred to a different image forming apparatus to output.

The image forming system disclosed in JP-A 2004-126607 is configured so that image data inputted by an arbitrary image forming apparatus can be output by a different image forming apparatus. However, JP-A 2004-126607 does not describe the structure in which image data once printed can be reprinted. Moreover, not only the image forming system 200 requires the document management system 209 for integrally managing a plurality of sets of image data, but also each of the image forming apparatuses 201, 202, and 203 also requires a server system for integrally managing IDs.

SUMMARY OF THE INVENTION

An object of the invention is to provide an image forming apparatus capable of reprinting image data once printed without requiring a server system for integrally managing image data, and an image forming system.

The invention provides an image forming apparatus capable of reprinting image data once printed, comprising:

a communication section for implementing data communication with another image forming apparatus;

a storage section for storing image data inputted in printing;

an information generating section for generating log information including position information of the inputted image data to record the log information on a recording medium outside the apparatus; and a data reading section for specifying, when the log information is read from the recording medium having the log information recorded thereon, a storage section in which desired image data used for reprinting is stored, from storage sections provided in a plurality of image forming apparatuses capable of implementing data communication, based on the position information included in the log information, to read the desired image data from the specified storage section.

According to the invention, when image data is inputted in printing, a storage section stores the inputted image data, and an information generating section generates log information including position information of the image data to record the log information on a recording medium outside the apparatus. The log information recorded on the recording medium in this way serves as a verification key to read desired image data in reprinting. When the log information is read from the recording medium having such log information recorded thereon, a data reading section specifies a storage section in which desired image data used for reprinting is stored, from among storage sections provided in a plurality of image forming apparatuses capable of implementing data communication, based on the position information included in the log information, to read the desired image data from the specified storage section. In this way, since the desired image data is read from the storage section individually provided in the image forming apparatus, it is possible to acquire the image data used in reprinting without requiring a server system for integrally managing image data.

Further, in the invention, it is preferable that the recording medium is an IC (Integrated Circuit) card.

According to the invention, the recording medium for recording the log information is an IC card. Only with an ID for identifying a user, the ID can be illegally used by a third party with physical and electric analysis and the security is not satisfied. On the IC card, not only an ID number of the user but a password and the like are saved as an authentication key to use the image forming apparatus, and the IC card has tamper resistance to prevent the physical and electric analysis, and prevents the illegal use of the authentication key. Accordingly, the log information recorded on the IC card realizes very high concealment and reliability and therefore can prevent the third party from reading the image data illegally, resulting that secret information can be protected.

Further, in the invention, it is preferable that the recording medium is capable of recording a plurality of sets of log information, and the data reading section selects desired log information from among the plurality of sets of log information and specifies a storage section based on position information included in the log information thus selected.

According to the invention, the recording medium is capable of recording a plurality of sets of log information, and the data reading section selects desired log information from the plurality of sets of log information and specifies the storage section based on position information included in the selected log information. Accordingly, it is possible to select and read the desired image data from a plurality of sets of image data based on the log information.

Further, in the invention, it is preferable that the image forming apparatus includes a data conversion preventing section for preventing information of image data stored in the storage section from being rewritten.

According to the invention, a data conversion preventing section prevents information of image data stored in the storage section from being rewritten. Accordingly, it is prevented that the image data stored in the storage section is lost and that the position information is changed. As a result, it is possible to prevent that the log information recorded on the recording medium is different from the information of the image data stored in the storage section.

Further, in the invention, it is preferable that the information generating section generates log information further including lifetime information that defines predetermined lifetime before deletion of the inputted image data, and the image forming apparatus comprises:

an information providing section for providing the lifetime information to the inputted image data; and a data updating section for updating lifetime before deletion of the image data based on the lifetime information applied to the image data and deleting the image data when reaching the predetermined lifetime.

According to the invention, the information generating section generates log information further including lifetime information. In addition, an information providing section provides the lifetime information to the inputted image data and a data updating section updates lifetime, based on the lifetime information, before deletion of the image data. In this way, the image data is deleted based on the lifetime information, it is possible to automatically delete unnecessary image data and to secure a capacity of free space in the storage section.

Further, the invention provides an image forming system comprising:

a plurality of image forming apparatuses connected to each other through the communication section in a state allowing data communication, wherein when the desired image data is read to be reprinted, from one image forming apparatus into which the recording medium having the log information recorded thereon is inserted, in the one image forming apparatus, the data reading section specifies a storage section in which the desired image data is stored, from among the storage sections provided in the plurality of image forming apparatuses capable of implementing data communication, based on the position information included in the log information, and transmits the log information through the communication section to an image forming apparatus having the specified storage section, and in the image forming apparatus that has received the log information, the data reading section reads image data from the specified storage section based on the position information included in the received log information, and transmits the read image data through the communication section to the one image forming apparatus.

According to the invention, the plurality of image forming apparatuses are connected through the communication section in a state allowing data communication. When the desired image data is read to be reprinted, from one image forming apparatus into which the recording medium having the log information recorded thereon is inserted, in the one image forming apparatus, the data reading section specifies a storage section in which the desired image data is stored, from among the storage sections provided in the plurality of image forming apparatuses capable of implementing data communication, based on the position information included in the log information, and transmits the log information through the communication section to an image forming apparatus having the specified storage section. In the image forming apparatus that has received the log information, the data reading section reads image data from the specified storage section based on the position information included in the received log information, and transmits the read image data through the communication section to the one image forming apparatus. In this way, since the desired image data is read from each storage section provided in the plurality of image forming apparatuses that are connected by the communication section, it is possible to acquire the image data used in reprinting from an optional image forming apparatus without requiring a server system for integrally managing image data.

Further, in the invention, it is preferable that when the one image forming apparatus receives through the communication section image data transmitted from another image forming apparatus, the one image forming apparatus transmits the log information including the position information and the lifetime information through the communication section to the another image forming apparatus, and in the another image forming apparatus, the information providing section provides the lifetime information to the image data stored in the storage section specified from the position information, based on the received log information, and the data updating section updates the lifetime before deletion of the image data based on lifetime information applied to the image data, and deletes the image data when reaching the predetermined lifetime.

According to the invention, when the one image forming apparatus receives through the communication section image data transmitted from another image forming apparatus, the one image forming apparatus transmits the log information including the position information and the lifetime information through the communication section to the another image forming apparatus. In addition, in the another image forming apparatus, the information providing section provides the lifetime information to the image data stored in the storage section specified from the position information, based on the received log information. Moreover, in the another image forming apparatus, the data updating section updates the lifetime before deletion of the image data based on the lifetime information applied to the image data. In this way, since the image data is deleted based on the lifetime information, it is possible to automatically delete unnecessary image data and to secure a capacity of free space in the storage section.

Further, in the invention, it is preferable that when the one image forming apparatus receives through the communication section the image data transmitted from the another image forming apparatus, the one image forming apparatus stores the received image data in the storage section, and deletes any one of image data among same image data stored in each of the storage section provided in the one image forming apparatus and the storage section provided in the another image forming apparatus, and when the image data is deleted from the storage section provided in the another image forming apparatus, in the one image forming apparatus, the information generating section generates updated log information including new position information to record on the recording medium.

According to the invention, when the one image forming apparatus receives through the communication section the image data transmitted from the another image forming apparatus, the one image forming apparatus stores the received image data in the storage section, and deletes any one of image data among same image data stored in each of the storage section provided in the one image forming apparatus and the storage section provided in the another image forming apparatus. As a result, it is possible to prevent one image data from being stored in the storage sections of the plurality of image forming apparatuses in duplicate.

Further, in the invention, it is preferable that each of the storage sections of the plurality of image forming apparatuses stores the same image data, and when the one image forming apparatus reads the desired image data, the one image forming apparatus selects a storage section of a most available image forming apparatus of the storage sections of the plurality of image forming apparatuses that store the desired image data, transmits the log information through the communication section to the image forming apparatus which has the selected storage section, and requests transmission of the desired image data.

According to the invention, each of the storage sections of the plurality of image forming apparatuses stores the same image data, and when the one image forming apparatus reads the desired image data, the one image forming apparatus selects a storage section of a most available image forming apparatus of the storage sections of the plurality of image forming apparatuses that store the desired image data, transmits the log information through the communication section to the image forming apparatus which has the selected storage section, and requests transmission of the desired image data. For example, it is possible that the one image forming apparatus selects an image forming apparatus so that a communication cost is lowest, and requests transmission of the desired image data. Moreover, the one image forming apparatus transmits the log information to the plurality of image forming apparatuses, selects an image forming apparatus which realizes speeding-up of communication, and requests transmission of the desired image data.

Further, in the invention, it is preferable that each of the storage sections of the plurality of image forming apparatuses stores the same image data, and when the one image forming apparatus reads the desired image data, the one image forming apparatus transmits the log information including the position information and the lifetime information through the communication section to all image forming apparatuses having the storage sections which store the same image data as the desired image data, and in the all image forming apparatuses that have received the log information, the information providing section provides the lifetime information to the image data stored in the storage section specified from the position information, based on the received log information, and the data updating section updates the lifetime before deletion of the image data, based on the lifetime information applied to the image data, and deletes the image data when reaching the predetermined lifetime.

According to the invention, the one image forming apparatus transmits the log information including the position information and the lifetime information through the communication section to all image forming apparatuses having the storage section that stores the same image data as the desired image data and requests transmission of the desired image data. In addition, in the all image forming apparatuses that have received the log information, the information providing section provides the lifetime information to the image data stored in the storage section specified from the position information, based on the received log information, and the data updating section updates the lifetime before deletion of the image data, based on the lifetime information applied to the image data. In this way, the image data is deleted based on the lifetime information, resulting that it is possible to automatically delete unnecessary image data and to secure a capacity of free space in each of the storage sections.

Further, in the invention, it is preferable that each of the storage sections of the plurality of image forming apparatuses stores the same image data, and when the one image forming apparatus reads the desired image data, in all image forming apparatuses having the storage section which stores the same image data as the desired image data, when a capacity of free space in the storage section is not more than a predetermined capacity, a signal to prompt to permit deletion of the image data is transmitted through the communication section to the one image forming apparatus, and when the signal to permit to delete the image data is received from the one image forming apparatus through the communication section, the image data permitted to delete is deleted.

According to the invention, in all image forming apparatuses having the storage section that stores the same image data as the desired image data, when a capacity of free space in the storage section is not more than a predetermined capacity, a signal to prompt to permit deletion of the image data is transmitted through the communication section to the one image forming apparatus. In addition, when the signal to permit to delete the image data is received from the one image forming apparatus through the communication section, the image data permitted to delete is deleted. Accordingly, when the capacity of free space in the storage section becomes not more than the predetermined capacity and the capacity approaches to vacancy, the image data permitted to delete is deleted, resulting that it is possible to secure a capacity of free space in the storage section.

BRIEF DESCRIPTION OF DRAWINGS

Other and further objects, features, and advantages of the invention will be more explicit from the following detailed description taken with reference to the drawings wherein.

DETAILED DESCRIPTION

Figure 1:
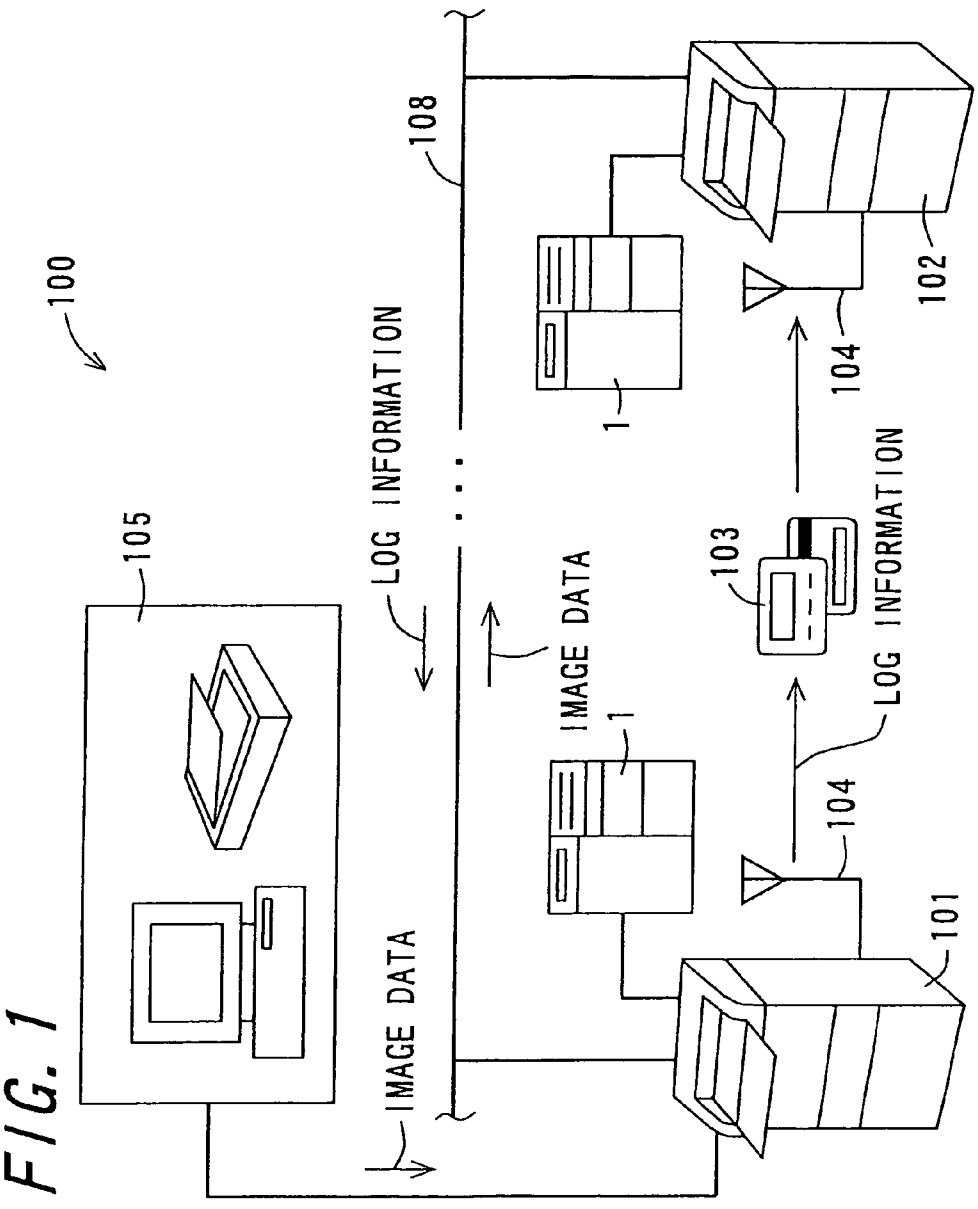
FIG. 1 is a view showing the structure of an image forming system in the invention.

Now referring to the drawings, preferred embodiments of the invention are described below.

Figure 2:
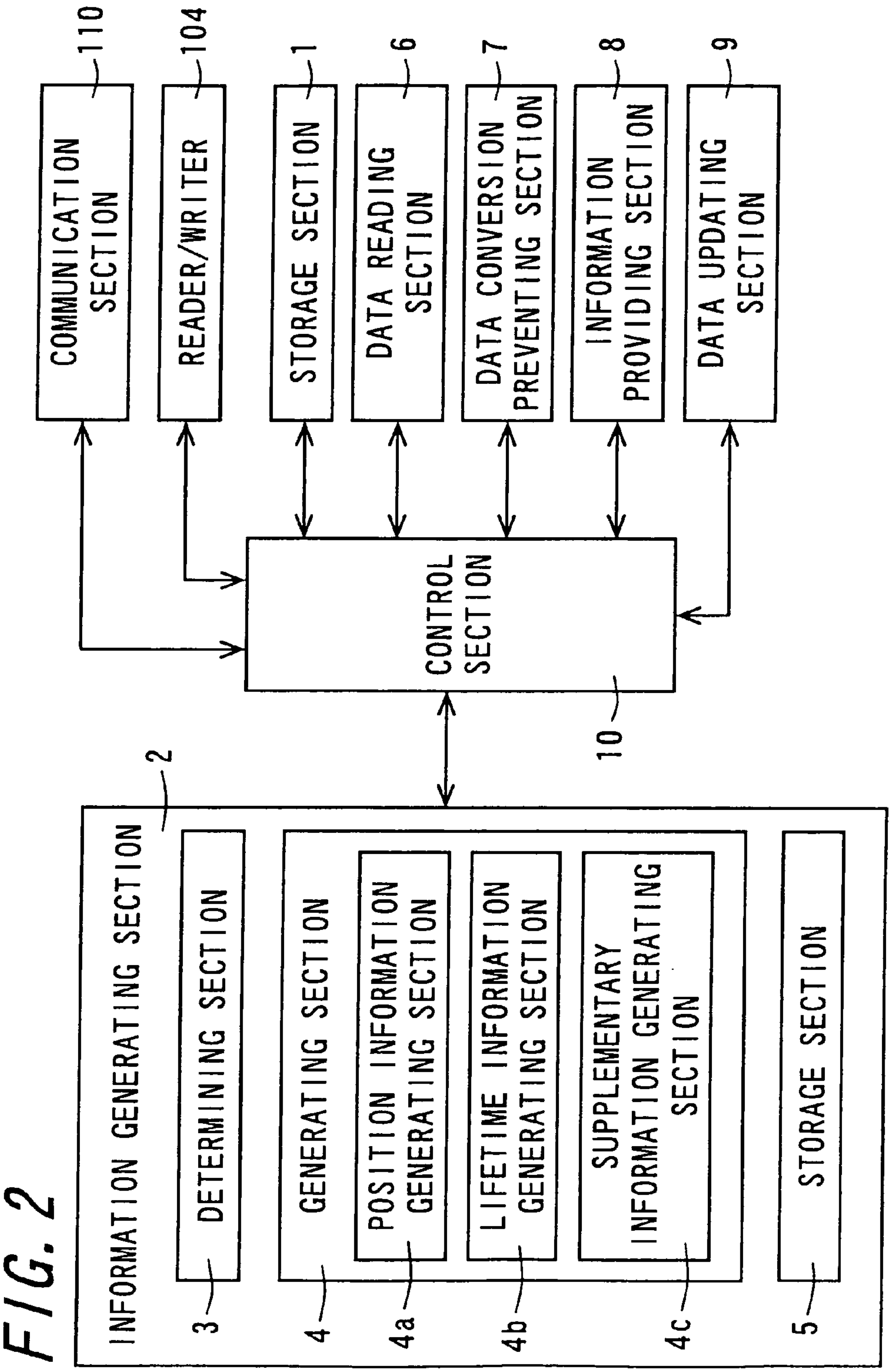
FIG. 2 is a block diagram showing the structure of an image forming apparatus according to an embodiment of the invention.

FIG. 1 is a view showing the structure of an image forming system 100 in the invention. Moreover, FIG. 2 is a block diagram showing the structure of an image forming apparatus according to an embodiment of the invention. In the image forming system 100, a plurality of image forming apparatuses 101 and 102 are connected through a network 108 in a state allowing data communication, so that image data once printed can be read from an optional image forming apparatus to be reprinted. The network 108 is, for example, a LAN (Local Area Network) composed of Ethernet (registered trademark).

In the following description, it is assumed that the image forming apparatus 101 is an image inputting apparatus accompanied by an image forming apparatus or a storage source apparatus into which image data is inputted through a client apparatus and which stores image data used in reprinting, and the image forming apparatus 102 is an output destination apparatus for reading image data to carrying out reprinting. Here, image data inputted into the image forming apparatus 101 may be a subordinate result such as a copy operation and a print operation in the image forming apparatus 101. In the present embodiment, image data created by the image inputting apparatus 105 composed of a PC and the like is inputted into the image forming apparatus 101. Moreover, reprinting refers to that image data that has been inputted into the image forming apparatus 101 and printed once is not discarded immediately but is stored in a storage section 1 provided in the image forming apparatus 101, which will be described below, and the stored image data is used again to be reprinted. Hence, when carrying out reprinting, it is not necessary to input the image data once used in printing again by the image inputting apparatus 105, thus making it possible to omit labor of inputting the image data again. In addition, reprinting also refers to that image data stored in the storage section 1 provided in the image forming apparatus 101 is read from the optional image forming apparatus 102 different from the image forming apparatus 101 which is a storage source apparatus so as to be printed.

As shown in FIG. 2, the image forming apparatuses 101 and 102 serving as an image forming apparatus of the invention are configured by having the storage section 1, an information generating section 2, a reader/writer 104, a data reading section 6, a data conversion preventing section 7, an information providing section 8, a data updating section 9, a control section 10, and a communication section 110 for implementing data communication with another image forming apparatus through the network 108. The image forming apparatuses 101 and 102 can implement data communication mutually by connecting the respective communication sections 110 to the network 108. The storage section 1 stores image data inputted in printing. The storage section 1 is a document management storage for providing, to image data, management information including position information and information of setting of file attribute in reprinting. Moreover, the storage section 1 may store image data by a conversion process and a compression process to inputted image data so that a capacity of the image data to be stored is reduced.

The information generating section 2 generates log information based on the management information applied to the image data that is inputted and stored in the storage section 1, and records the log information on a recording medium outside the apparatus. In this way, by generating the log information to record on the recording medium based on the management information applied to the image data, the log information corresponding to the inputted image data can be recorded on the recording medium.

Next, description will be given for a recording medium. When a general medium is used as a recording medium, there are advantages that a recording capacity is large, and a reader/writer apparatus for reading recorded information is distributed abundantly so that compatibility with an interface is high. However, the general medium allows an illegal operation easily due to its versatility, thus the log information can be stolen or tampered. Therefore, when using the general medium, it is necessary to incorporate a security mechanism, which will be described below, such as encryption in the log information itself, but even in such a case, the security is not sufficient. As a result, the recording medium used in the invention preferably has excellent portability and security, such as a mobile phone and an IC card, for preventing recorded information from being read by anyone, and an IC card 103 is used in the embodiment.

On the IC card 103, not only an ID number of a user but a password and the like are saved as an authentication key for using an image forming apparatus. The IC card 103 has tamper resistance to prevent physical and electric analysis, and prevents illegal use of the authentication key. Hence, log information recorded on the IC card 103 realizes very high concealment and reliability and therefore can prevent a third party from reading image data illegally, resulting that secret information can be protected. However, a recording capacity of the IC card 103 is a few KB, which is very small, (in FeliCa which is a standard IC card most common in Japan as of 2007, the minimum management unit of data is 16 byte and the total capacity is 4 KB), thus a large volume (for example, a volume of more than several tens MB) of image data cannot be generally recorded on the IC card 103. In the invention, a small volume of log information for specifying image data is recorded on the IC card 103.

Figure 3:
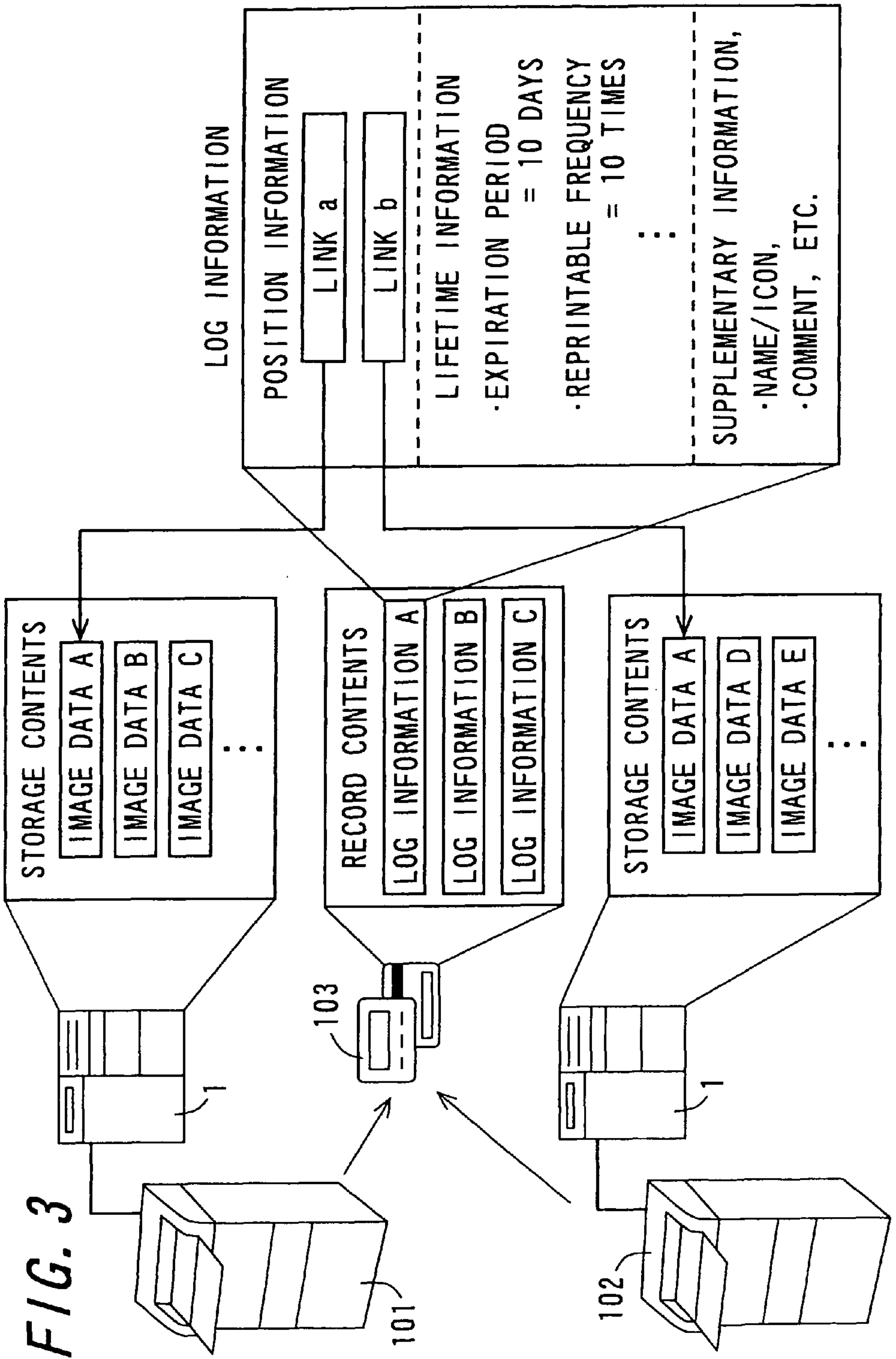
FIG. 3 is a view illustrating log information recorded on the IC card.

Next, description will be given for log information, with reference to FIG. 3. FIG. 3 is a view illustrating log information recorded on the IC card 103. In the following description, it is assumed that a plurality of sets of log information A, B, and C corresponding to image data A, B, and C, respectively, among image data A, B, and C recorded in the storage section 1 of the image forming apparatus 101 and image data A, D, and E stored in the storage section 1 of the image forming apparatus 102, is recorded on the IC card 103.

The log information is information serving as a verification key for reading desired image data in reprinting, and the volume of which is much smaller than that of image data (taking the recording capacity of the IC card into consideration, a volume of one log information is several tens byte). Moreover, the log information is allowed to be recorded only on an electronic recording medium provided with a secure mechanism such as the IC card 103, or in a client apparatus.

The log information includes position information, which is enough when it can be interpreted within the image forming apparatus, and may be position information cut out from the management information that is applied to the image data stored in the storage section 1, and there is no need to newly construct information. When the position information is an LDAP (Lightweight Directory Access Protocol) or the like that is composed of information of a general file system and an IP (Internet Protocol) address of a data server can be known from the information or it is easy to reach a data base itself with a directory structure and the like, it is not desirable that the position information is kept in a plain sentence and it is necessary to scramble the position information by any encryption. In such a case, another specific management mechanism is not required other than an encryption/decoding mechanism. Moreover, in the image forming system 100, based on the position information of the log information recorded on the IC card 103, the image data stored in the storage section 1 of the image forming apparatus 101 is read through the communication section 110 and the network 108. Hence, the position information included in the log information needs to have an amount of information that allows individual image forming apparatuses connected through the communication section 110 and the network 108 to be determined by. The log information A recorded on the IC card 103 shown in FIG. 3 includes a link a and a link b, each of which is position information of the image forming apparatuses 101 and 102 that store image data A corresponding to the log information A.

Furthermore, the log information generated by the information generating section 2 may include lifetime information and supplementary information. The lifetime information defines predetermined lifetime before deletion of the image data stored in the storage section 1. Examples of the lifetime information include information of an expiration period showing a period from a date when the image data is inputted and stored in the storage section 1 to a date when it is deleted, and information of a reprintable frequency showing an image data reprintable frequency, and the expiration period and the reprintable frequency may be used in combination. The supplementary information includes information of a digest or an icon of the image data, an update history, and a comment. When a plurality of sets of log information is recorded on the IC card 103, the supplementary information serves as a good guide to select desired log information from the plurality of sets of log information.

The information generating section 2 includes a determining section 3, a generating section 4, and a recording section 5. The determining section 3 determines whether or not inputted image data has been already stored in the storage section 1. At this time, the determining section 3 determines whether or not the inputted image data is existent, based on the management information applied to the image data stored in the storage section 1. The generating section 4 generates log information of the inputted image data. When the determining section 3 determines that the inputted image data is existent data, the generating section 4 does not generate log information, and when it is not determined to be existent data, the generating section 4 generates log information. The generating section 4 includes a position information generating section 4*a* for generating the position information, a lifetime information generating section 4*b* for generating the lifetime information, and a supplementary information generating section 4*c* for generating the supplementary information. The recording section 5 records the log information generated by the generating section 4 on the IC card 103 inserted into the reader/writer 104. The reader/writer 104 reads the log information recorded on the inserted IC card 103. Although the IC card 103 realizes very high concealment and reliability, the card itself can be stolen or illegally used. Thus, as the reader/writer 104 for reading the log information, it is preferable to provide an authentication section for authenticating a user using biometrics or the like.

Figure 4:
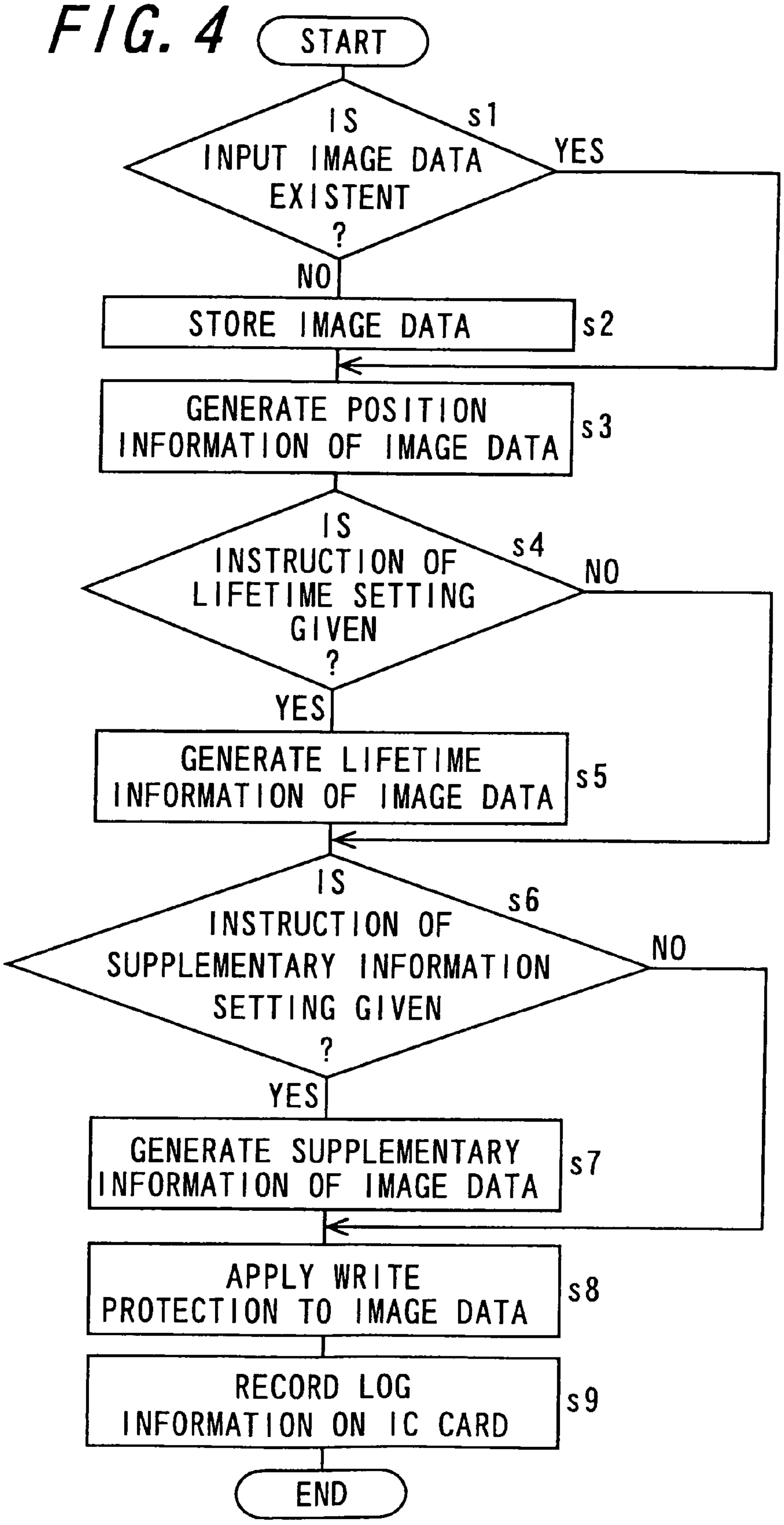
FIG. 4 is a flowchart showing an operation to issue log information for inputted image data.

FIG. 4 is a flowchart showing an operation to issue log information for inputted image data. The image forming apparatus 101 firstly prints image data inputted from the image inputting apparatus 105. At this time, the storage section 1 stores the inputted image data as image data for which reprinting is set. In this way, when the inputted image data is stored in the storage section 1, an operation to issue log information is started. First, at step s1, the determining section 3 determines whether or not the inputted image data is data that has been already stored in the storage section 1. At this time, the determining section 3 determines whether or not the inputted image data is existent, based on management information applied to image data stored in the storage section 1. When the determining section 3 determines that the inputted image data is existent, the procedure proceeds to step s3, and when determining that it is not existent, the procedure proceeds to step s2.

At step s2, the storage section 1 stores the inputted image data in a state of being applied with the management information. Then, at step s3, the position information generating section 4*a* generates position information of the inputted image data based on position information included in the management information of the image data. At this time, when a plurality of image forming apparatuses have the same image data, the position information generating section 4*a* generates a plurality of sets of position information corresponding to each of the image forming apparatuses. However, in this case, it is necessary that a constraint such as inhibition of change of the image data in reprinting is applied so that identity of the plurality of sets of image data is certified. Subsequently, at step s4, it is determined whether or not an instruction about setting of lifetime information is inputted from an operation panel, which will be described below. When the instruction of lifetime setting is inputted, the procedure proceeds to step s5, and when the instruction of lifetime setting is not inputted, the procedure proceeds to step s6. At step s5, the lifetime information generating section 4*b* generates lifetime information of the inputted image data.

Then, at step s6, it is determined whether or not an instruction about setting of supplementary information is inputted from the operation panel. When the instruction about setting of supplementary information is inputted, the procedure proceeds to step s7, and when the instruction about setting of supplementary information is not inputted, the procedure proceeds to step s8. At step s7, the supplementary information generating section 4*c* generates supplementary information of the inputted image data. In this way, generation of the log information including the position information, the lifetime information, and the supplementary information corresponding to the inputted image data is completed. At step s8, the data conversion preventing section 7 performs write protection to the image data inputted and stored in the storage section 1. Subsequently, at step s9, the recording section 5 records the log information on the IC card 103 inserted into the reader/writer 104. At this time, the generated log information may be stored in the storage section for backup or verification. Moreover, steps s1 to s9 may be repeated so that a plurality of sets of log information is recorded on one IC card 103. In this way, the operation to issue the log information for the inputted image data is completed.

When the log information is recorded on the IC card 103 and the IC card 103 is inserted into the reader/writer 104 to read the log information as described above, the data reading section 6 specifies a storage section in which desired image data used for reprinting is stored among storage sections provided in a plurality of image forming apparatuses capable of implementing data communication, based on the position information included in the log information, to thereby read the desired image data from the specified storage section. At this time, when the image data stored in the storage section 1 is same as the inputted image data or is data obtained by a conversion process to the inputted image data, the data reading section 6 reads the data as it is, and when it is data obtained by a compression process to the inputted image data, the data reading section 6 reads the data after decompression.

As described above, the image forming apparatus of the invention is configured so that desired image data used in reprinting is read from a storage section individually provided in the image forming apparatus, thus making it possible to acquire the image data used in reprinting without requiring a server system for integrally managing image data. In addition, a storage section in which the image data used in reprinting is stored is specified based on position information included in log information, thus it is not necessary to additionally provide a search section for searching the desired image data.

Furthermore, the image forming apparatus of the invention includes the data conversion preventing section 7, the information providing section 8, the data updating section 9, and the control section 10. The data conversion preventing section 7 prevents the management information applied to the image data stored in the storage section 1 from being rewritten mistakenly. Specifically, the data conversion preventing section 7 performs write protection or prohibition of defragmentation to the image data stored in the storage section 1. Thereby, it is prevented that the image data stored in the storage section 1 is mistakenly lost or position information is mistakenly changed. As a result, it is possible to prevent that the log information recorded on the IC card 103 is different from the management information applied to the image data stored in the storage section 1.

The information providing section 8 provides the lifetime information included in the log information recorded on the IC card 103 to image data corresponding to the log information. The data updating section 9 updates lifetime before deletion of the image data based on the lifetime information applied to the image data, and when reaching predetermined lifetime shown by an expiration period, a reprintable frequency, or the like, the image data is deleted. In this way, the image data is deleted based on the lifetime information, thus making it possible to automatically delete unnecessary image data and to secure a capacity of free space in the storage section 1. In addition, the control section 10 integrally controls the storage section 1, the information generating section 2, the reader/writer 104, the data reading section 6, the data conversion preventing section 7, the information providing section 8, and the data update section 9, which have been described above. Moreover, the control section 10 controls each section based on a signal inputted from the operation panel provided in the image forming apparatus. An instruction about setting of lifetime information, an instruction about setting of supplementary information, and an instruction about setting of conditions in reprinting are inputted from the operation panel.

Figure 5:
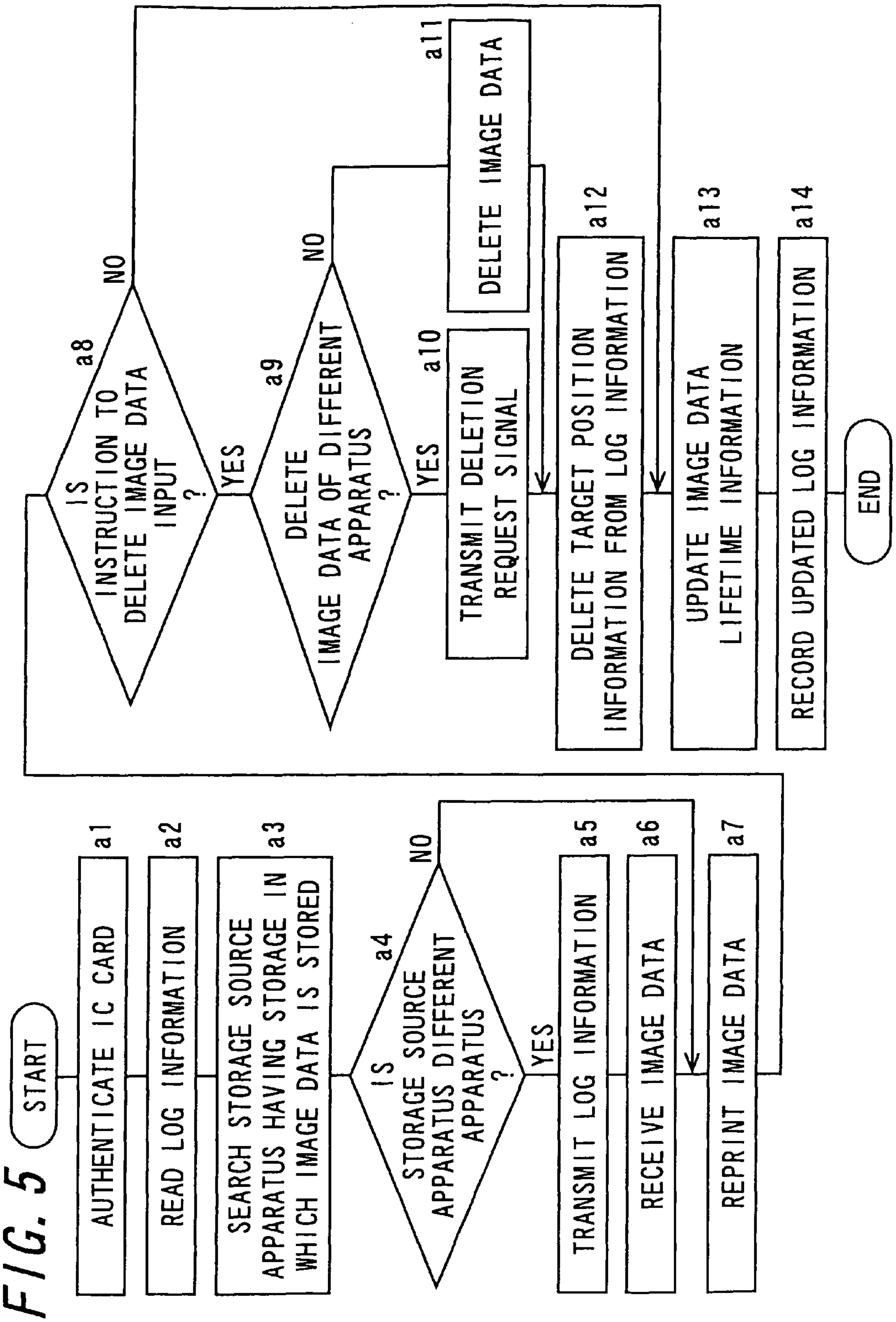
FIG. 5 is a flowchart showing an operation to reprint image data in the image forming system.
Figure 6:
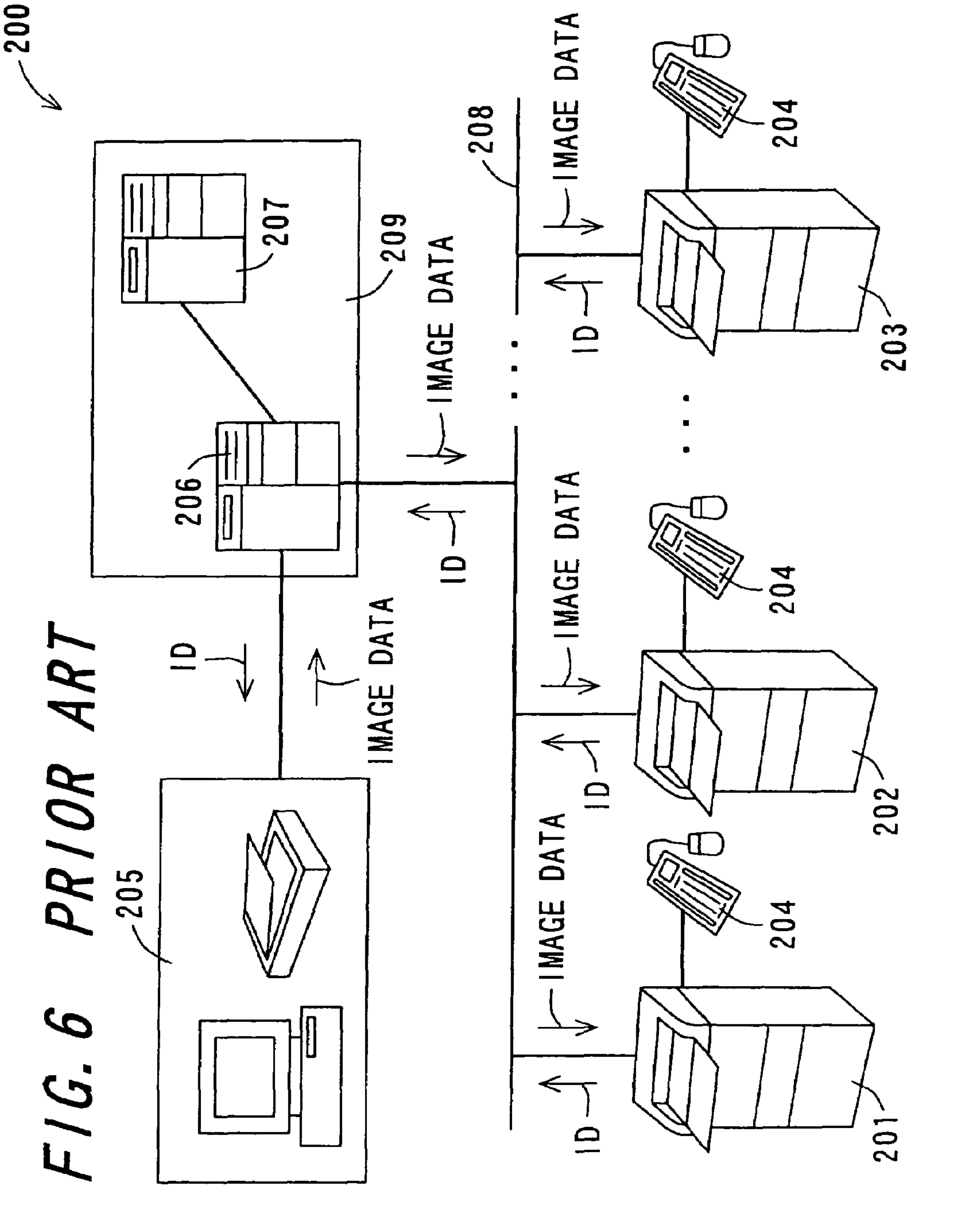
FIG. 6 PRIOR ART
FIG. 6 is a view showing the structure of an image forming system in a related art.

FIG. 5 is a flowchart showing an operation to reprint image data in the image forming system 100. The operation to reprint image data in the image forming system 100 will hereinafter be described with reference to FIG. 1. First, at step a1, the image forming apparatus 102 which is an output destination apparatus carries out an authentication process based on an authentication key of the IC card 103 inserted into the reader/writer 104. Then, at step a2, the reader/writer 104 of the image forming apparatus 102 reads log information recorded on the inserted IC card 103. Thereafter, the data reading section 6 of the image forming apparatus 102 searches a storage source apparatus having the storage section (storage) 1 in which desired image data used in reprinting is stored, based on position information included in the log information. At this time, when a plurality of sets of log information is recorded on the IC card 103, a list of the recorded log information is displayed on the operation panel of the image forming apparatus 102. When specific log information is selected and an instruction is inputted from the operation panel, the data reading section 6 searches a storage source apparatus based on the instructed log information.

Subsequently, at step a4, the data reading section 6 determines whether the storage source apparatus is the image forming apparatus 102 or an apparatus different from the image forming apparatus 102, based on the position information of the log information. When the data reading section 6 determines that it is not a different apparatus, the procedure proceeds to step a7, and when determining that it is a different apparatus, the procedure proceeds to step a5. At step a5, the data reading section 6 of the image forming apparatus 102 transmits the log information through the communication section 110 and the network 108 to the image forming apparatus 101 which is the storage source apparatus having the storage section 1 specified based on the position information of the log information. At this time, when the log information includes a plurality of sets of position information, the data reading section 6 selects a storage section of the most available image forming apparatus, transmits the log information to the image forming apparatus which has the selected storage section, and requests transmission of desired image data. For example, the data reading section 6 selects an image forming apparatus so that a communication cost is lowest, and requests transmission of desired image data. Moreover, the data reading section 6 transmits the log information to a plurality of image forming apparatuses, selects an image forming apparatus which realizes speeding-up of communication, and requests transmission of desired image data.

Moreover, in the image forming apparatus 101 serving as the storage source apparatus that has received the log information transmitted from the image forming apparatus 102, the data reading section 6 specifies and reads image data corresponding to the received log information by collating the received log information and management information of the image data (or own log information stored in the storage section for verification). Then, the image data is transmitted through the communication section 110 and the network 108. Subsequently, at step a6, the image forming apparatus 102 receives through the communication section 110 and the network 108 the image data transmitted from the image forming apparatus 101. Thereafter, at step a7, the image forming apparatus 102 reprints the received image data. In this way, desired image data is read from each storage section provided in a plurality of image forming apparatuses connected to each other through the communication section 110 and the network 108, thus making is possible to acquire image data used in reprinting from an optional image forming apparatus without requiring a server system for integrally managing image data.

Moreover, when the image forming apparatus 101 serving as the storage source apparatus has a different structure from that of the image forming apparatus 102 serving as the output destination apparatus, there is a case that reprinting cannot be carried out with same setting due to presence/absence of functions or characteristics of components. In this case, a printed matter is adjusted in accordance with a predetermined rounding rule. At this time, the image forming apparatus may display an alert message such as “adjust to print” on the operation panel, may display an instruction to select whether or not carrying out reprinting even with different finishing, or may cancel the reprinting. Moreover, although error recovery in reprinting depends on an operation policy, the procedure never proceeds to the following step unless the reprinting is completed.

Next, at step a8, the image forming apparatus 102 determines whether or not an instruction to delete the image data is inputted into the operation panel. When determining that the instruction to delete the image data is inputted, the procedure proceeds to step a9, and when determining that the instruction to delete the image data is not inputted, the procedure proceeds to step a13. Here, the instruction to delete the image data is inputted by selecting specific position information included in the log information from a list of log information displayed on the operation panel. At step a9, the image forming apparatus 102 determines whether the instruction to delete the image data is for the image forming apparatus 102 itself or an apparatus different from the image forming apparatus 102. When determining that it is not for a different apparatus, the procedure proceeds to step a11, and when determining that it is for a different apparatus, the procedure proceeds to step a10. At step a10, the image forming apparatus 102 transmits through the communication section 110 and the network 108 a deletion request signal for requesting deletion of the image data to the image forming apparatus to be a target of the instruction of the image data deletion. At step a11, the image forming apparatus 102 deletes the image data to be a target of deletion that is stored in the own storage section 6 based on the instruction of the image data deletion.

At step a12, the information generating section 2 of the image forming apparatus 102 deletes, from the log information, the position information corresponding to the image data that has been deleted based on the instruction of the image data deletion. Then, at step a13, each of the image forming apparatuses 101 and 102 updates lifetime information included in the log information.

Specifically, in the image forming apparatus 101, the information providing section 8 provides the lifetime information to the image data specified from the position information of the log information stored in the storage section 1 based on the log information received from the image forming apparatus 102. The data updating section 7 then updates lifetime before deletion of the image data based on the lifetime information applied to the image data. When the image forming apparatus 102 transmits the log information to a plurality of image forming apparatuses, all of the image forming apparatuses that have received the log information update a lifetime before deletion of the image data in the same way as the image forming apparatus 101. Moreover, in the image forming apparatus 102, the information generating section 2 updates the log information based on the updated lifetime information. In this way, the image data is deleted based on the lifetime information, thus making it possible to automatically delete unnecessary image data and to secure a capacity of free space in the storage section. Subsequently, at step a14, the information generating section 2 of the image forming apparatus 102 records the updated log information on the IC card 103 inserted into the reader/writer 104. In this way, when the updated log information is recorded on the IC card 103, an operation to reprint the image data in the image forming system 100 is completed.

In the flowchart above, although the operation to delete the image data is carried out based on the image data deletion instruction inputted into the image forming apparatus 102 serving as the output destination apparatus, the image data may be deleted as follows. That is, when all image forming apparatuses having a storage section in which image data same as the image data used in reprinting is stored have a capacity of free space not more than a predetermined capacity with respect to the storage capacity of the storage section, a signal to prompt to permit deletion of the image data is transmitted through the communication section 110 and the network 108 to the image forming apparatus 102. When the signal to prompt to permit deletion of the image data is received from the image forming apparatus 102 through the communication section 110 and the network 108, the image data permitted to delete is deleted. At this time, in the image forming apparatus 102, the instruction to permit deletion of the image data is inputted after specific position information included in the log information is selected from a list of the log information displayed on the operation panel. In this way, when the capacity of free space in the storage section becomes not more than the predetermined capacity and the capacity approaches to vacancy, the image data permitted to delete is deleted, resulting that it is possible to secure a capacity of free space in the storage section.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming system, comprising a plurality of image forming apparatuses connected to each other in a state of allowing data communication among them, each of said image forming apparatuses comprising:

a communication section that performs the data communication;

a storage section that stores image data;

an information generating section that generates log information of the image data, the log information including position information indicative of an address of the image data in the system and lifetime information that defines how long image data is to be stored in the storage section;

a reader/writer that writes the log information generated by the information generating section to an IC card and reads log information of desired image data stored in the IC card;

a data reading section that, based on the log information of the desired image data, identifies a storage section which stores the desired image data, and transmits via the communication section the log information of the desired image data and a request to send the desired image data to an image forming apparatus which comprises the storage section so identified;

an information providing section that provides the lifetime information to the image data; and a data updating section that sets time to delete the image data from the storage section based on the lifetime information provided to the image data, wherein the plurality of image forming apparatuses comprises a first image forming apparatus, a second image forming apparatus, and a third image forming apparatus, and, in a case where the first image forming apparatus performs image forming operation based on the desired image data and both the second and the third image forming apparatuses store the desired image data, the first image forming apparatus selects one of the second and third image forming apparatuses which realizes the data communication lower in cost of higher in speed, and transmits the log information and the request to send the desired image data to the image forming apparatus thus selected.

2. The image forming system of claim 1, wherein:

the IC card stores a plurality of sets of log information; and the data reading section selects the log information of the desired image data from among the sets of log information stored on the IC card and identifies the storage section which stores the desired image data based on position information included in the log information so selected.

3. The image forming system of claim 1, wherein:

each of the image forming apparatuses further comprises a data conversion preventing section that prevents the image data stored in the storage section from being rewritten.

4. The image forming system of claim 1, wherein:

in a case where the first image forming apparatus has selected the second image forming apparatus, the first image forming apparatus transmits the log information of the desired image data and the request to send the desired image data to the second image forming apparatus, the second image forming apparatus receives via the communication section thereof the log information of the desired image data and the request to send the desired image data, and the data reading section of the second image forming apparatus reads the desired image data from the storage section of the second image forming apparatus based on the log information of the desired image data, and sends the desired image data to the first image forming apparatus.

5. The image forming system of claim 4, wherein:

the information providing section of the second image forming apparatus provides the lifetime information to the desired image data based on the log information received, and the data updating section of the second image forming apparatus updates a time to delete the desired image data based on the lifetime information provided to the desired image data.

6. The image forming system of claim 5, wherein:

the first image forming apparatus stores the desired image data and performs the image forming operation based on the desired image data, and then the desired image data is deleted from either the first image forming apparatus or the second image forming apparatus.

7. The image forming system of claim 6, wherein:

in a case where the desired image data is deleted from the second image forming apparatus, the first image forming apparatus generates updated log information including new position information.

8. The image forming system of claim 1, wherein:

the first image forming apparatus transmits the log information to the second and third image forming apparatuses, each of the information providing sections of the second and third image forming apparatuses provides lifetime information to the desired image data based on the log information received, and each of the data updating sections of the second and third image forming apparatuses sets a time to delete the desired image data based on the lifetime information provided to the desired image data.

9. The image forming system of claim 1, wherein:

each of the second and third image forming apparatuses transmits, to the first image forming apparatus, a signal which seeks permission to delete the desired image data when a capacity of free space in the storage section is not more than a predetermined capacity, and deletes the desired image data when a signal which permits the deletion of the desired image data is received from the first image forming apparatus.

* * * * *